United States Patent
Kanbe

(10) Patent No.: US 7,961,377 B2
(45) Date of Patent: *Jun. 14, 2011

(54) DISPERSION, MICROCAPSULE, ELECTROPHORETIC DEVICE, ELECTRO-OPTICAL DEVICE, AND METHOD OF FORMING A DISPERSION

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,861

(22) Filed: Apr. 1, 2010

(65) Prior Publication Data

US 2010/0208331 A1    Aug. 19, 2010

Related U.S. Application Data

(62) Division of application No. 11/322,223, filed on Jan. 3, 2006, now Pat. No. 7,719,755.

(30) Foreign Application Priority Data

Feb. 24, 2005 (JP) .................................. 2005-049308

(51) Int. Cl.
*G02B 26/00* (2006.01)

(52) U.S. Cl. ...... 359/296; 345/107; 430/32; 252/301.35
(58) Field of Classification Search .................. 359/296; 345/107; 430/32; 252/301.35
See application file for complete search history.

(56) References Cited

U.S. PATENT DOCUMENTS

| 6,113,810 | A  | 9/2000 | Hou et al. |
| 6,947,203 | B2 | 9/2005 | Kanbe |
| 7,050,218 | B2 | 5/2006 | Kanbe |
| 7,719,755 | B2 * | 5/2010 | Kanbe ........................ 359/296 |

FOREIGN PATENT DOCUMENTS

| JP | A-2002-202532 | 7/2002 |
| JP | A-2002-236298 | 8/2002 |
| JP | A-2003-295235 | 10/2003 |

* cited by examiner

*Primary Examiner* — Evelyn A. Lester
(74) *Attorney, Agent, or Firm* — Oliff & Berridge, PLC

(57) ABSTRACT

A method for making an electrophoretic solution includes: including two kinds of particles having different charging polarities into the electrophoretic solution; calculating a mixing ratio so that charge amounts of the two kinds of particles become approximately equal to each other on a basis of a unit volume of a dispersion medium; and mixing the two kinds of particles in each mixed quantity that satisfies the calculated mixing ratio.

15 Claims, 4 Drawing Sheets

10 : ELECTROPHORETIC DISPLAY DEVICE

DISPERSION, MICROCAPSULE, ELECTROPHORETIC DEVICE, ELECTRO-OPTICAL DEVICE, AND METHOD OF FORMING A DISPERSION

CROSS REFERENCE TO RELATED APPLICATIONS

This is a Division of application Ser. No. 11/322,223 filed Jan. 3, 2006, This application also claims priority to Japanese Patent Application No. 2005-049308, filed Feb. 24, 2005. The disclosure of the prior applications is hereby incorporated by reference herein in its entirety.

BACKGROUND

1. Field of the Invention

The present invention relates to an electrophoretic display technique for changing visual condition by controlling electric field application in a display unit having charged particles and a section for applying voltage, especially a method for making an electrophoretic solution including two kinds of charged particles having different charging polarities.

2. Related Background of the Invention

As an electrophoretic display device, there is an electrophoretic display device using two kinds of particles wherein two kinds of dispersion particles having different colors and different charging polarities are dispersed in a colorless dispersion medium. JP-A-2003-295235 is an example of related art, wherein a technique that enables multicolor display by evolving such a two-particle electrophoretic display device is proposed.

As in the case of JP-A-2003-295235, there have been no particular considerations on the mixing ratio of the two kinds of particles. When the two kinds of particles have close physical properties, it is not relatively difficult to obtain preferable display performance by mixing the two in each sufficient quantity.

In many cases, however, there are significant differences between the sizes, weights, etc. of positively charged particles and negatively charged particles. Under such significant differences in physical properties, it has been difficult to find a proper quantity of particles to be included. For example, in order to calculate a preferable mixing ratio, it has been inevitable to repeat experiments many times by varying the quantity of particles to be mixed. It is fortunate if a preferable result is obtained accidentally in the first try. If not, there has been no way but to repeat experiments aimlessly. Under such circumstances, development has not progressed efficiently. Moreover, there has been almost no proof that the determined mixing ratio is the most preferable one.

SUMMARY

An advantage of the invention is to provide methods for making an electrophoretic display solution that enable the determination of the most preferable mixing ratio of two kinds of particles having different charging polarities, as well as electrophoretic solutions, microcapsules, and an electrooptic device.

The applicant of the invention has reached a hypothesis that what is important is that the two kinds of particles has the same charge density per unit volume in a dispersion medium and, in an experiment based on the hypothesis, obtained a very preferable result. That is, according to a first aspect of the invention, a method for making an electrophoretic solution includes: including two kinds of particles having different charging polarities into the electrophoretic solution; calculating a mixing ratio so that the charge amounts of the two kinds of particles become approximately equal to each other on the basis of the unit volume of a dispersion medium; and mixing the two kinds of particles in each mixed quantity that satisfies the calculated mixing ratio.

According to a second aspect of the invention, an electrophoretic solution includes two kinds of particles having different charging polarities. In such an electrophoretic solution, a mixing ratio is calculated so that the charge amounts of the two kinds of particles become approximately equal to each other on the basis of the unit volume of a dispersion medium. Further, the two kinds of particles are mixed and coordinated in each mixed quantity that satisfies the calculated mixing ratio.

More specifically, according to a third aspect of the invention, another method for making an electrophoretic solution includes: including two kinds of particles having different charging polarities into the electrophoretic solution; determining the mixing ratio of first particles having a first charging polarity to second particles having a second charging polarity that is different from the first charging polarity, based on a first mobility, a first particle size, and a first density of the first particles and a second mobility, a second particle size, and a second density of the second particles; and setting a mixed quantity W1 of the first particles and another mixed quantity W2 of the second particles so that the determined mixing ratio is satisfied.

According to a fourth aspect of the invention, another electrophoretic solution includes: first particles having a first charging polarity, a first mobility, a first particle size, and a first density; and second particles having a second charging polarity that is different from the first charging polarity, a second mobility, a second particle size, and a second density. In such an electrophoretic solution, the first particles and the second particles are mixed in a dispersion medium. Further, the mixing ratio of the first particles to the second particles is determined based on the first and the second mobilities, the first and the second particle sizes, and the first and the second densities. Furthermore, the first and the second particles are mixed in each mixed quantity that satisfies the determined mixing ratio.

According to the first to fourth aspects of the invention, a mixing ratio is determined so that the charge amounts of the two kinds of particles become approximately equal to each other on the basis of the unit volume of a dispersion medium. Hence, both kinds of particles show the same behavior at the reverse of electric field direction. Therefore, preferable display performance can be guaranteed even when the two kinds of particles have different colors, etc. To be more specific, the charge amount per unit volume of a dispersion medium containing charged particles is affected by the mobility, particle size, and density of the charged particles. Therefore, by taking into consideration the physical values of the foregoing factors, the charge amounts of the first and the second particles per unit volume of a dispersion medium can be made approximately the same.

In addition, the mobility of particles in a dispersion medium is proportional to the zeta potential of particles in the dispersion medium. Therefore, zeta potential can also be employed as a determining factor instead of mobility.

Further, according to the fifth aspect of the invention, yet another method for making an electrophoretic solution includes including two kinds of particles having different charging polarities into the electrophoretic solution. In this method, when: the two kinds of particles are defined as first particles having a first charging polarity and second particles having a second polarity that is different from the first charging polarity; regarding the first particles, a first zeta potential is represented as $\zeta 1$, a first particle size is represented as R1, a first density is represented as D1, and a first mixed quantity is represented as W1; and regarding the second particles having the second charging polarity that is different from the first charging polarity, a second zeta potential is represented as $\zeta 2$, a second particle size is represented as R2, a second density is represented as D2, and a second mixed quantity is represented as W2, the first mixed quantity W1 and the second mixed quantity W2 are determined so that the mixing ratio of the first particles to the second particles W1/W2 satisfies a numerical expression shown below.

$$\frac{W1}{W2} = \frac{\zeta 2}{\zeta 1} \cdot \frac{R1}{R2} \cdot \frac{D1}{D2} \qquad \text{Expression 1}$$

By the calculation using the above factors based on the condition that the two kinds of charge amounts per unit volume are approximately equal to each other, it is understandable that the above relation is necessary. Especially, since zeta potential, particle size, and density are measurable using dedicated measuring instruments, it is easy to determine the mixed quantity based on the above factors.

Under such circumstances, it is preferable that the mixed quantity W1 of the first particles and the mixed quantity W2 of the second particles are determined so that the mixing ratio W1/W2 of the first particles to the second particles satisfies a relation of 0.2<W1/W2<5. This is because it has been confirmed that a visually preferable mixing ratio can be obtained within a range that satisfies the above relation. That is, the relation means that the ratio of the mixed quantities of the first particles to the second particles is smaller than 1:5, or the other way around (the difference between the two is small).

According to a sixth aspect of the invention, a microcapsule includes an electrophoretic solution that is made by the above methods for making an electrophoretic solution and is configured of an electrophoretic solution according to the above conditions. Further, an electrooptic device includes such a microcapsule.

In the above description, the word "electrooptic device" mentions general devices that utilizes a phenomenon that is caused when charged particles such as titania particles, etc. included in an electrophoretic solution are electrically moved by an electric field applied. The device includes electronic papers, clocks, calculators, cellular phones, personal digital assistants, etc. Especially, the device includes electrophoretic display devices that utilize the visual change of colors accompanied by the migration of charged particles. As long as an electrophoretic solution is used, things that are hardly considered as a device, such as paper/film-like things having flexibility, as well as things that belong to real estate including walls, etc. and movable bodies including vehicles, flight vehicles, vessels, etc. having such flexible things on, for example, are also included.

BRIEF DESCRIPTION OF THE DRAWINGS

The invention will be described with reference to the accompanying drawings, wherein like numbers reference like elements.

DETAILED DESCRIPTION OF EMBODIMENTS

Figure 1:
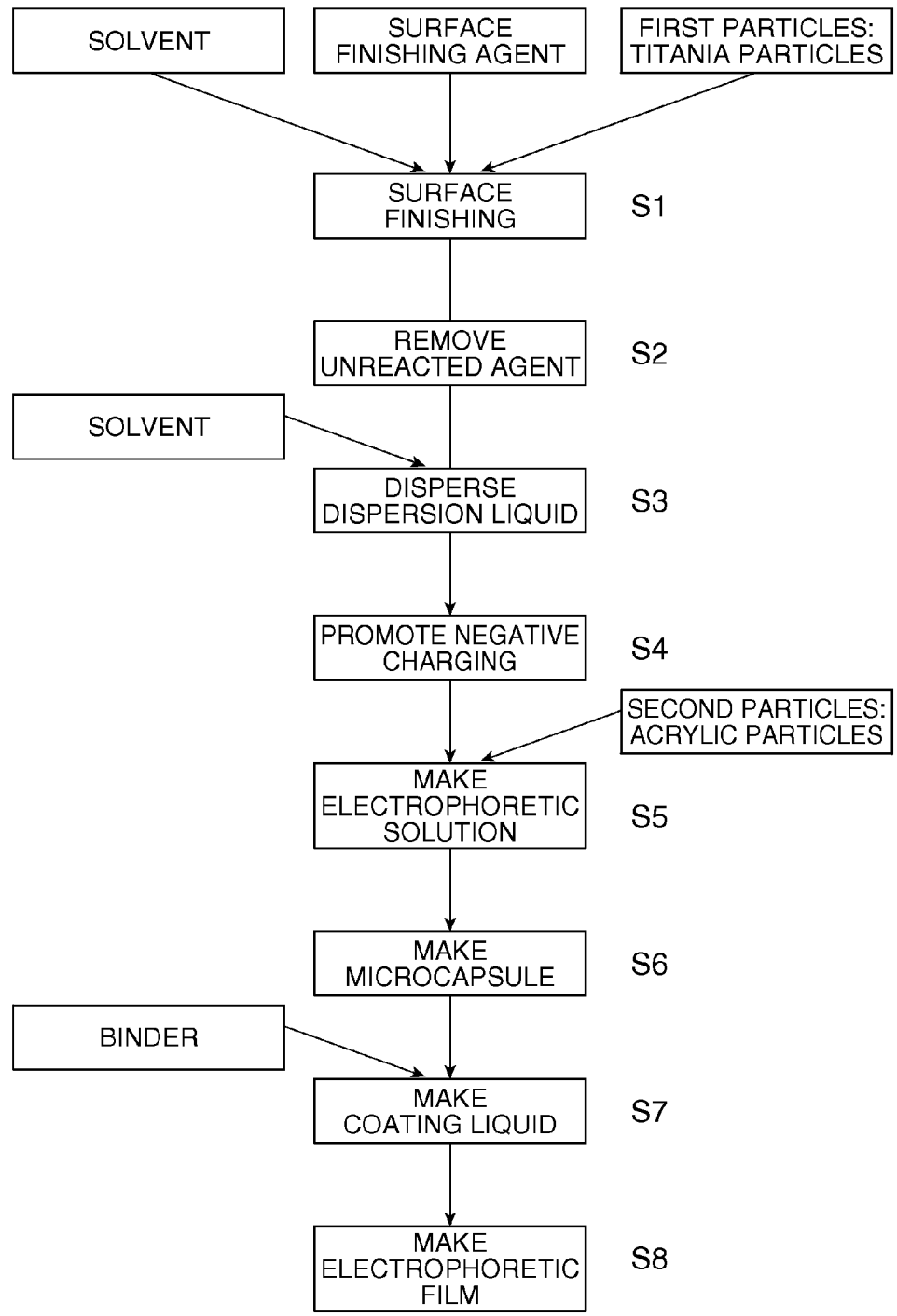
FIG. 1 is a flow chart describing a method for making an electrophoretic solution according to a working example of the invention.

An embodiment of the invention will now be described with reference to the accompanying drawings. The following embodiment is only an example and the invention can be modified variously within the scope of the invention.

First, the principles of the embodiment of the invention will be described.

A method for making an electrophoretic solution according to the embodiment of the invention is to coordinate two kinds of particles so that both particles have the same charge density per unit volume in a dispersion medium. Now, what is necessary for satisfying the above condition will be considered specifically.

An electrophoretic solution having two kinds of charged particles, particles 60 and 70, including first particles and second particles, dispersed in a dispersion medium 50 will be considered. It is assumed that the first particles have a charge amount Q1 per unit volume in the dispersion medium and that the second particles, which have a different charging polarity from that of the first particles, have another charge amount Q2 per unit volume in the dispersion medium. It is also assumed that a mixing ratio is calculated based on a hypothesis that it is preferable that the charge amounts Q1 and Q2 of the two kinds of particles are approximately equal in the above two-particle electrophoretic solution.

Under the above conditions, a charge amount q per single particle is expressed as the product of a charge density a of the particle itself and a surface area s of the particle. Hence, the following expression applies:

$q$ (charge amount per particle)$\propto \sigma$ (charge density on particle surface)$\times s$ (surface area of particle).

Here, provided that the electric field is constant, there is a correlation between the charge density $\sigma$ of a particle and the mobility $\mu$ of the particle. Hence, the following relation holds true:

$\sigma$ (charge density of particle)$\propto \mu$ (mobility of particle).

Under the above conditions, on the surfaces of the charged particles that are dispersed in the dispersion medium, ions having a charging polarity opposite to that of the particles are gathered. The concentration of ions is high near the surfaces of the charged particles and becomes lower with distance from the particle surfaces. Near the surfaces of the charged particles, an electric double layer in a state where ions are almost fixed is formed. When the potential of the outer surface including the electric double layer is high, the charged particles repel to each other to form a stable state of dispersion. The potential on the surface of the electric double layer (slideway) on which the charged particles are fixed is called a zeta potential $\zeta$, which is used as an index for measuring the behavior of fine particles dispersed in a dispersion medium.

Here, there is a known relation between the mobility $\mu$ and the zeta potential $\zeta$ as shown below, wherein the dielectric constant is represented as $\epsilon$; the electric field is represented as E; Henry's function is represented as f; and the viscosity is represented as $\eta$:

$\mu$ (mobility of particle)$=\epsilon \cdot \zeta \cdot E \cdot f/6\pi\eta$.

When the behavior in the same dispersion medium is considered, the following relation applies:

$$\mu \text{ (mobility of particle)} \propto \zeta \text{ (zeta potential)}.$$

Hence, the charge amount q per particle is expressed as follows:

$$q \text{ (charge amount per particle)} \propto \zeta \text{ (zeta potential)} \times s \text{ (surface area of particle)}. \quad (1)$$

Here, a total charge amount Q of the particles per unit volume of the dispersion medium is calculated by multiplying the charge amount q per particle and the number N of existing particles together, which is expressed as follows:

$$Q \text{ (charge amount per unit volume)} = q \text{ (charge amount per particle)} \times N \text{ (number of particles)}. \quad (2)$$

Representing the mixed quantity (mass) of the particles to be mixed as W; the density of the particles in the dispersion medium as D; the radius of the particle as R; and the volume per single particle as v, the following expression applies based on the above expressions (1) and (2):

$$Q \propto \zeta \times s \times W/D \times 1/v.$$

Further, the following expression also applies:

$$Q \propto \zeta \times (4\pi r^2) \times W/D \times 1/(4\pi r^3/3),$$

$$= 3 \cdot \zeta \cdot W/D \cdot r. \quad (3)$$

According to the hypothesis, the charge amounts of the first particles and the second particles, which have charging polarities opposite to each other, are equal to each other on the basis of unit volume. Therefore, when the charge amount of the first particles is represented as Q1 and the charge amount of the second particles is represented as Q2, the following expression needs to be satisfied:

$$Q1 = Q2.$$

Hence, representing: regarding the first particle, a first zeta potential as $\zeta 1$; a first particle size as R1; a first density as D1; and a first mixed quantity as W1; and regarding the second particles, a second zeta potential as $\zeta 2$; a second particle size as R2; a second density as D2; and a second mixed quantity as W2, the mixing ratio W1/W2 of the first particles to the second particles needs to satisfy a numerical expression shown below:

$$\frac{W1}{W2} = \frac{\zeta 2}{\zeta 1} \cdot \frac{R1}{R2} \cdot \frac{D1}{D2} \qquad \text{Expression 2}$$

The zeta potential $\zeta$, the particle radius R, and the density D are measurable using dedicated measuring instruments. Therefore, it has been found convenient to calculate each of the mixed quantities W1 and W2 so that the mixing ratio of the mixed quantity W1 of the first particles to the mixed quantity W2 of the second particles that can be calculated according to the above expression is satisfied.

In addition, as described above, the mobility $\mu$ of particles in a dispersion medium is proportional to the zeta potential $\zeta$ of particles in the dispersion medium. Therefore, the mobility $\mu$ can also be employed instead of the zeta potential $\zeta$.

According to the manufacturing steps shown in FIG. 1, the applicant of the invention has made electrophoretic solutions at various mixing ratios W1/W2 of the first particles to the second particles based on the above result and examined the visibility in several cases of applying an electric field to the electrophoretic solutions. As a result, it has been confirmed on a practical basis that preferable visibility can be obtained when the following relation holds true. That is, the mixing ratio W1/W2 of the first particles to the second particles satisfies the following relation: 0.2<W1/W2<5.

Details will be described later. When two kinds of particles having almost the same zeta potential (mobility), particle size, and density are used, the mixing ratio of the two is found to be approximately 1. Usually, however, any of the above factors shows different values. In such a case, the mixed quantity of each of the two kinds of particles can be determined after determining the mixing ratio according to Expression 2.

That is, in order to determine a mixing ratio for practical purposes, zeta potential (mobility), particles size, and density need to be calculated for each of the first particles to be used and the second particles having a charging polarity opposite to that of the first particles. When purchasing particles, information on mobility and particle size, which is usually provided in specifications, needs to be confirmed. When the actual mobility (zeta potential), particle size, or density is unknown in the case where surface finishing is required, etc., mobility or zeta potential, particle size, or density in the dispersion liquid needs to be measured before the other kind of particles are dispersed. Therefore, it is preferable to: make one kind of particles first that require such processes as surface finishing, etc. and the measurement of the above factors in the actual dispersion medium; disperse the particles in the dispersion medium; and then measure the above factors. When particles on the market are used and the physical values of the above factors are clearly described, the particles on the market only need to be dispersed later. When the above factors need to be measured regarding both kinds of particles, the above factors needs to be measured first separately for each kind of particles using the same dispersion medium. After that, both kinds of particles can be mixed together.

As described above, according to the embodiment, an electrophoretic solution having a preferable visibility can be made and provided by determining the zeta potential or mobility, particle size, and density of each kind of charged particles included in a two-particle electrophoretic solution and, based on the values determined as such, calculating a mixing ratio that satisfies the relation shown as Expression 2. Especially, the factors used in the above process are all measurable or settable with ease. This means that a preferable index of mixing ratio in making a two-particle electrophoretic solution has been provided.

Figure 2:
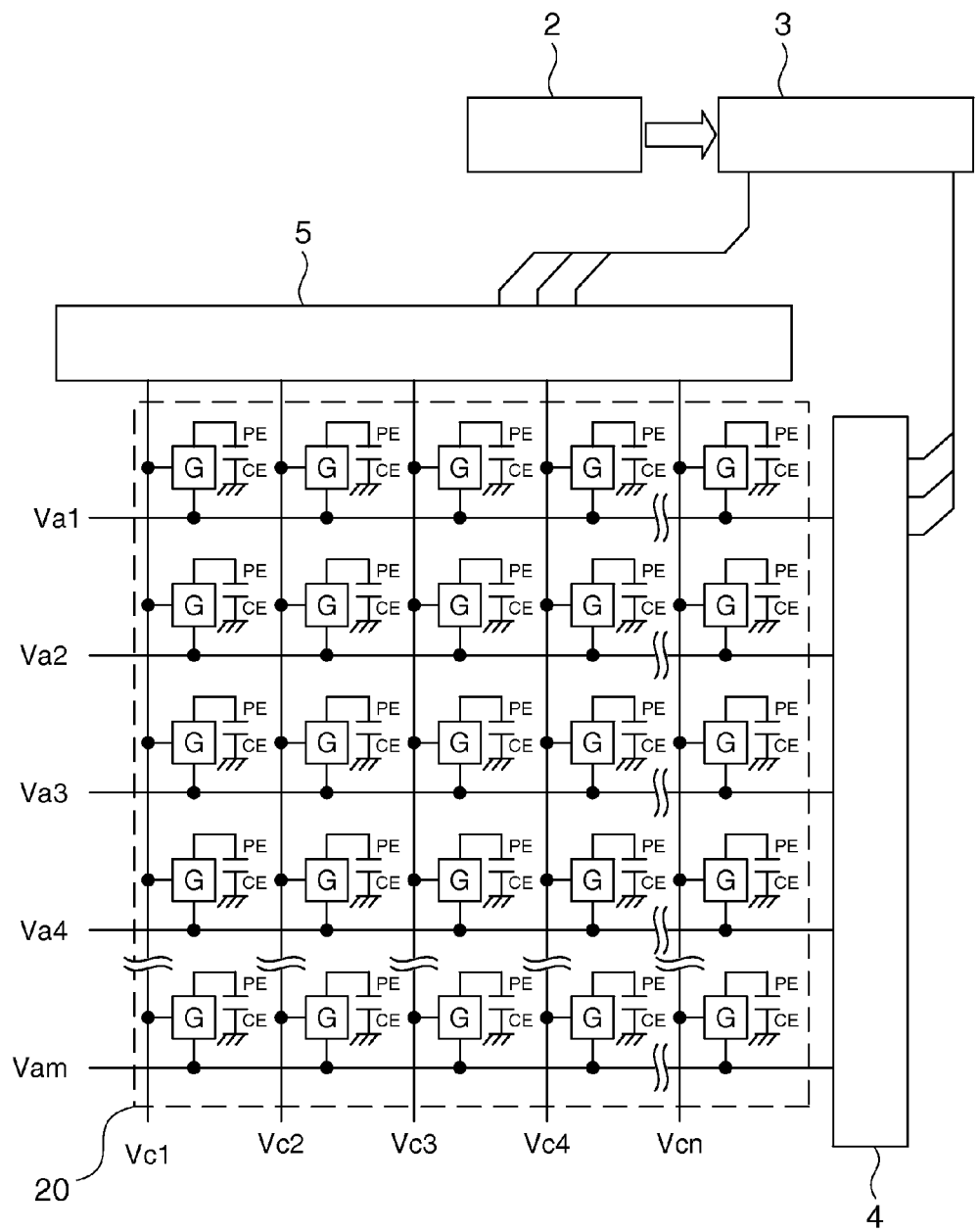
FIG. 2 is a block diagram of an electrophoretic device.

FIG. 2 shows the configuration of an electrooptic device (electrophoretic device) that displays images using microcapsules containing the above electrophoretic solution. The device configuration is a configuration of a so-called electronic paper.

As shown in FIG. 2, an electrooptic device 10 has a plurality of scanning lines Va1 to Vam and a plurality of drive lines Vc1 to Vcn, which are wired in a display area 20, configuring an active-matrix drive circuit. In each pixel, a pixel-driving circuit G is provided. When both the scanning line Va and the drive line Vc are on, a pixel electrode PE reacts to have a positive potential with respect to a common electrode CE. In any state other than the above, the pixel electrode PE reacts to have a negative potential with respect to the common electrode CE. A driver 4 drives each of the scanning lines Va1 to Vam, and a driver 5 drives each of the drive lines Vc1 to Vcn. To the drivers 4 and 5, a display control circuit 3 is coupled. The display control circuit 3 provides drive information by determining the drive voltages of the scanning line Va and the drive line Vc based on an image supplied from, for example, a computer.

With the electrophoretic device 10 that is configured as described above, when image information of a specific character, line drawing, etc. is provided from a computer 2, the direction of the electric field between the pixel electrode PE and the common electrode CE changes according to the on/off information of each pixel. Therefore, particles dispersed in a microcapsule migrate according to the electric field and, according to the migration, the kind of dispersed particles change. As a result, the color also changes, which enables the visual recognition of the information.

In addition, the electrophoretic device 10 according to the embodiment of the invention is not limited to a device using microcapsules as described above, but can be replaced by a device wherein the electrophoretic solution described above is filled in each of the pixels that are sectioned with partitions.

Further, the above driving method can be applied to not only an electromigration device employing so-called vertical migration, wherein images are displayed with the change of colors according to the vertical migration of charged particles that is caused when an electric field is applied in a direction vertical to the display surface, but also an electromigration device employing so-called horizontal migration, wherein images are displayed with the change of colors according to the horizontal migration of charged particles that is caused by an electric field that changes in a direction horizontal to the display surface.

Figure 3A:
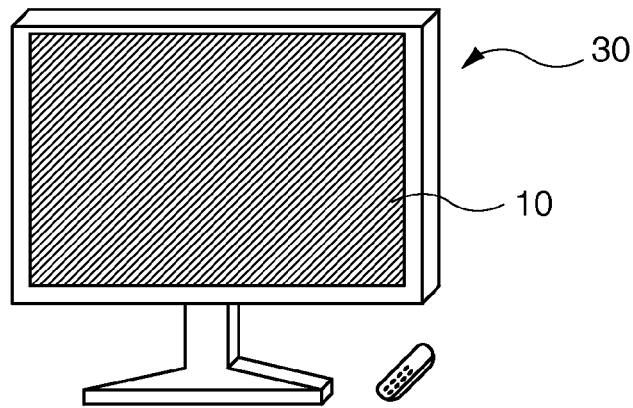
FIG. 3A is an example of an electrooptic device, which is a large-sized television device.
Figure 3B:
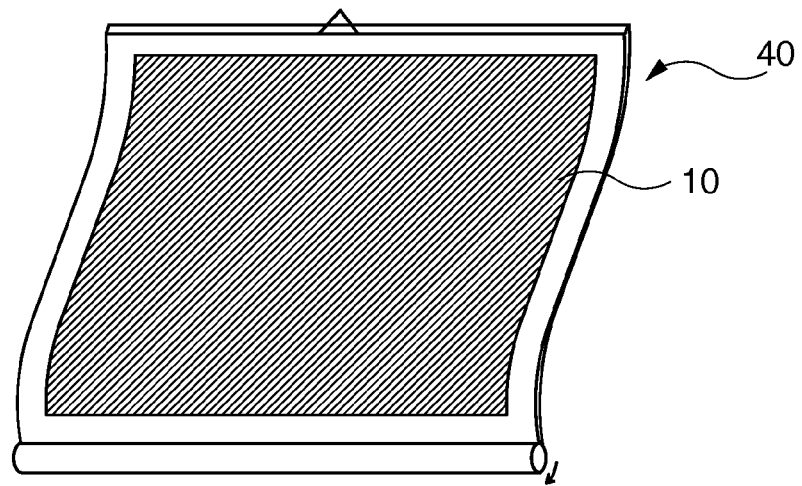
FIG. 3B is another example of an electrooptic device, which is a roll television device.
Figure 4:
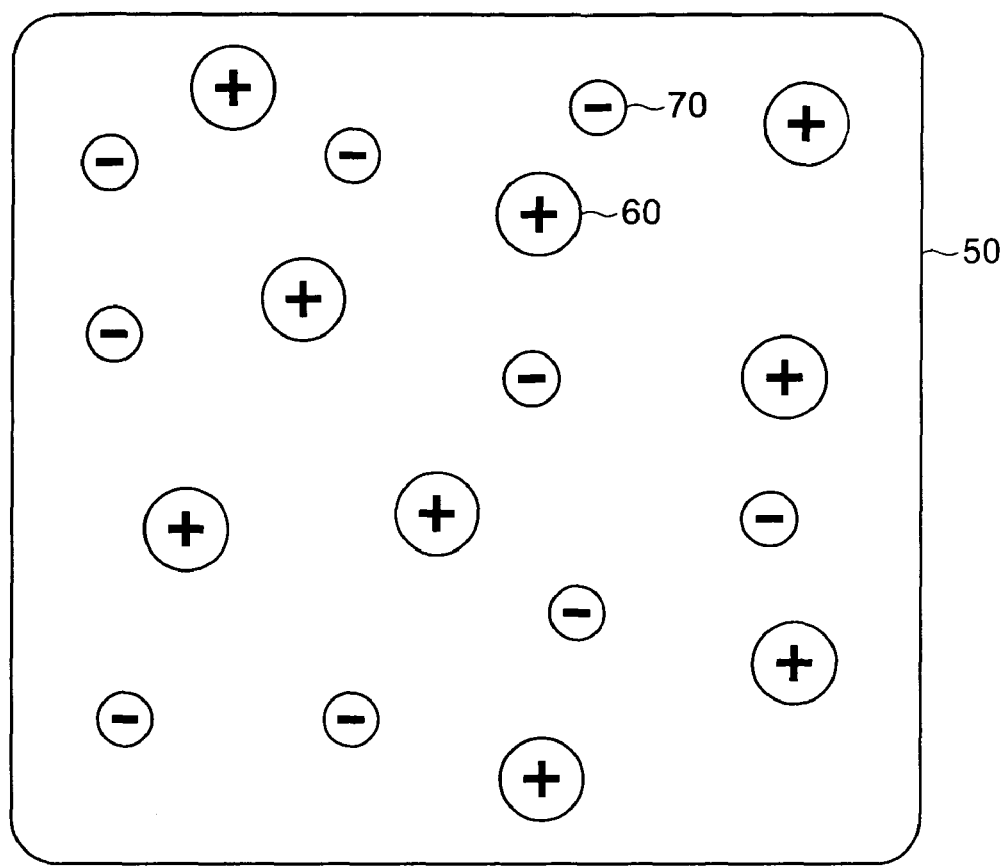
FIG. 4 is an example of particles dispersed in a dispersion medium.

FIGS. 3A and 3B are examples of an electrooptic device (electronic device) to which the above electrophoretic device 10 is applied. FIG. 3A is an example of applying the electrophoretic device 10 to the display surface of a large-sized television device 30. FIG. 3B is another example of applying the electrophoretic device 10 to the display surface of a roll television device 40.

In addition, the scope of an electrooptic device applicable to the embodiment of the invention is not limited to the above devices but widely includes devices using the visual change of colors accompanied by the migration of charged particles. Other than the example devices described above, things that belong to real estate including walls, etc. and movable bodies including vehicles, flight vehicles, vessels, etc. that are configured so that an electric field can be applied to by applying a coating liquid are also included, for example.

Working Example

In order to obtain a preferable mixing ratio, the embodiment of the invention has been put into practice under various conditions.

In a working example described below, a comparison has been performed by changing the particle mixing ratio alone, at various mixing ratios W1/W2 of the mixed quantity W1 of the first particles (titania particles) to the mixed quantity W2 of the second particles (acrylic particles). Roughly according to the following steps, electrophoretic solutions have been made for the working example and comparative examples so as to examine the visibility of electrophoretic films using the solutions.

According to the flow chart shown in FIG. 1, an electrophoretic solution has been made and a film has been formed.
1) A step for finishing the surfaces of titania particles to be charged negative as the first particles (S1);
2) a step for removing the above composition having unreacted groups above finishing agent having the unreacted groups from the finished titania particles (S2);
3) a step for agitating the titania particles in a dispersion medium (S3);
4) a step for promoting the negative charging of the titania particles (S4);
5) a step for mixing positively charged acrylic particles as the second particles into the dispersion liquid wherein the titania particles are under migration (S5);
6) a step for making microcapsules (S6);
7) a step for making a coating liquid (S7); and
8) a step for making an electrophoretic film (S8).

(1) Surface Finishing (S1)

First, as a step S1, the surface finishing of titania particles has been performed. 50 grams of titania particles (CR-90 from Ishihara Sangyo Kaisha, Ltd.) as the first particles to be charged positive; 110 grams of hexane as a solvent; and 3.5 grams of dimethyl-n-octhylchrolosilane as a surface finishing agent have been put into a 500-milliliter three-neck flask and agitated at a solvent temperature of 55 degrees Celsius for approximately four hours. After that, centrifugal separation has been performed using a centrifuge and the finished titania particles have been extracted.

In addition, it is convenient to use marketed titania particles as the first particles, as in the above case, from the practical viewpoint. For example, the TTO series, ET series, ST/STS series, etc. from Ishihara Sangyo Kaisha can be used. Further, as the first particles, inorganic pigment particles such as white lead; zinc oxide; zinc sulfide; etc. and various organic pigment particles can also be used. As a method for applying surface finishing agent, dry processing and spray processing can also be employed, other than the above wet processing. As a particle processing method, direct processing, masterbatch processing, and dry concentration can be employed. As a solvent, a publicly known solvent that has a low solubility to both kinds of particles and a molecule amount suitable for both kinds of charged particles to migrate needs to be selected. As a surface finishing agent, publicly known agents such as silane series coupling agents, chromium series coupling agents, titanate series coupling agents, aluminum series coupling agents, zirconium series coupling agents, zircoaluminate coupling agents, fluorine series coupling agents, etc. can be used.

(2) Remove Unreacted Agent (S2)

Next, as a step for removing unreacted agent (S2), the surface finishing agent having unreacted group, etc. has been dissolved by adding an appropriate amount of hexane to the titania particles, which has previously been put into a container, and agitating the contents. After the dissolution, the particles have been cleansed using a centrifuge again to remove the unreacted agent. As a solvent, the same one as above can be selected. However, other publicly known solvents can also be used.

(3) Disperse Dispersion Liquid (S3)

Next, as a step for dispersing dispersion liquid (S3), after drying the titania particles obtained as above, 12.5 grams of the dried titania particles have been put into a 200-milliliter recovery flask and sealed after adding 90 milliliters of dodecylbenzene as a dispersion medium. Then, the contents has been mixed while agitating at 170 degrees Celsius for approximately two hours.

In addition, other publicly known dispersion mediums can also be used, as in the above case of solvents. Since the dispersion medium is used for finalizing the color of an electrophoretic solution, dyes can be dissolved considering the color of dispersed particles. Further, for the purpose of enhancing the dispersibility of charged particles in a dispersion medium, publicly known surfactants, protective colloids, etc. can also be used.

(4) Promote Negative Charging (S4)

In the above dispersion process, titania particles are charged negative. Depending on the type of the surface finishing agent or the conditions for dispersion, however, the negative charging of titania particles is not always sufficient. In the working example, for further promotion of the negative charging, the particles have been agitated for two more hours by introducing air into the flask, as a step for promoting negative charging (S4). With this step, a dispersion medium wherein a first allocation of negatively charged titania particles are added and dispersed has been obtained.

After putting the above dispersion medium into a cell having an electrode interval of 300 μm, mobility (which is proportional to the zeta potential ζ, as described above) has been measured. As a result, the mobility μ1 of titania particles, which are the first particles, has been confirmed to be −2.5×$10^{-6}$ [$cm^2/s \cdot V$]. Further, the particle size of the finished titania particles has been measured to be approximately 0.3 μm. In addition, in order to measure zeta potential directly, such instruments as "Zetasizer Nano Series" from Sysmex Corporation, a laser zeta potential meter ELS-6000 from Otsuka Electronics Co., Ltd., etc. can be used.

(5) Make Electrophoretic Solution (S5)

Next, as a step for making an electrophoretic solution (S5), 40 grams of the dispersion liquid wherein the negatively charged titania particles are dispersed; 10 grams of acrylic particles that are colored red as the second particles; and 40 grams of dodecylbenzene have been put into a 100-milliliter container and mixed while applying an ultrasonic wave and continuing agitation. The acrylic particles used are particles from Soken Chemical & Engineering Co., Ltd. According to the specifications, the mobility μ2 of the acrylic particles is 7.5×$10^{-6}$ [$cm^2/s \cdot V$] and the size of the acrylic particles is 4 μm. In this step, an electrophoretic solution wherein two different kinds of charged particles are dispersed has been completed.

(6) Make Microcapsules (S6)

Next, the microencapsulation of each electrophoretic solution has been performed.

Into a 500-milliliter beaker, 60 milliliters of water; 4.5 grams of gum arabic; and 4.5 grams of gelatin have been added and the contents has been dissolved. After the dissolution, the above solution has been agitated and mixed at a solution temperature of 43 degrees Celsius and a rotational speed of 250 rpm for approximately one hour. The rotational speed has gradually been accelerated while dropping the electrophoretic solution into the mixed solution. The final rotational speed has been set to 1000 rpm. From when the rotational speed has reached the final speed, the rotation has been maintained for thirty minutes. After the thirty-minute rotation, the rotational speed has been decelerated to 450 rpm and, with the addition of approximately 300 milliliters of hot water that is heated to 45 degrees Celsius, the agitation has been continued for approximately thirty minutes. Next, with the addition of 1.5 milliliters of approximately 10-percent sodium carbonate solution, the mixed solution has been made into a weak alkaline liquid. After continuing the agitation for approximately thirty minutes, with the gradual addition of 11 milliliters of 10-percent acetic acid solution, the mixed solution has eventually been made into an alkaline solution of pH approximately 4. After the addition of the acetic acid solution, the mixed solution has been cooled down to room temperature and further cooled with ice, maintaining the solution temperature around zero degree Celsius for approximately one hour. After maintaining for one hour, 2.5 milliliters of formalin solution and 20 milliliters of 10-percent sodium carbonate solution have been added, maintaining the solution temperature. After adding the above solutions, the mixed solution has been brought back to room temperature and agitated for approximately twelve hours. After the agitation for approximately twelve hours, the slurry of deposited microcapsules has been sifted to extract microcapsules according to diameters. The extracted microcapsules have been sorted and rinsed in water. In this step, microcapsules sizing 30 to 60 μm have been obtained.

(7) Make Coating Liquid (S7)

Next, as a step for making a coating liquid (S7), PLON-MF-40 from Shin-Etsu Chemical Co., Ltd., as an emulsion binder, has been mixed into a slurry containing the sorted microcapsules at a rate of 30 to 80 percent, which is used as a coating liquid.

Next, as a step for making an electrophoretic film (S8), the coating liquid has been applied so that there is no overlap of microcapsules but a single-microcapsule layer on a PET film on which pixel electrodes are formed using ITO. After the application, the coating liquid has been dried at 90 degrees Celsius for twenty minutes. By laying another PET film, which is entirely covered with ITO thin film, onto the microcapsule layer obtained as described above and bonding the two together using a laminator, an electrophoretic film has been completed.

In addition, in order to measure the density of the above-described particles, the same coating liquid is used. That is, the packing rate of microcapsules is examined by taking photographs of the coating liquid surface. Defining the closest packing as 1, the density value becomes smaller relatively as the unpacked region becomes larger.

According to the particle size, mobility, and density of the titania particles as the first particles and the particle size, mobility and density of the acrylic particles as the second particles, the mixing ratio W1/W2 has been calculated to be 0.8.

As a first comparative example, an electrophoretic solution has been made at a mixing ratio W1/W2 of 0.2 (5.0 in reciprocal ratio), changing the mixed quantity of titania particles and/or acrylic particles, to make a film as in the above working example. Further, as a second comparative example, particles having an excellent response in a single-particle state have been made at the mobility μ1 enhanced up to −18×$10^{-6}$ [$cm^2/s \cdot V$] by heating surface-finished titania particles for four or more hours. Then, a film has been made as in the above working example. The mixing ratio in the second comparative example is 10 (0.1 in reciprocal ratio).

By applying a voltage of 30 V between the electrodes that are provided opposite to each other on each of the electrophoretic films formed as above in the forward direction and the backward direction, an experiment for comparing the visibility of whether an electrode pattern appears or not has been performed.

TABLE 1

| Sample | Mixing ratio W1/W2 | Visibility |
|---|---|---|
| Working example | 0.7 | Very good |
| First comparative example | 0.2 | OK |
| First comparative example (reciprocal ratio) | 5.0 | OK |
| Second comparative example | 10.0 | Not good |
| Second comparative example (reciprocal ratio) | 0.1 | Not good |

As shown in Table 1, the electrode pattern is clearly visible in the working example. In the first comparative example, however, the electrode pattern is not so clearly visible, though drivable, with either of the red color of the acrylic particles or the white color of the titania particles having superiority. The first comparative example seems to have a borderline displayability. In the second comparative example, though the response speed of the titania particles has been confirmed good, the titania particles and the acrylic particles have adhered to each other, without showing any display pattern.

As a result of the above comparative experiment between the working example and the comparative examples, the hypothesis of the applicant that it is preferable that two kinds of charged particles have approximately the same charge density per unit volume has been proved. Further, it has also been proved that a preferable visibility from the practical viewpoint can be obtained under the following relation:

$$0.2 < W1/W2 \text{ (mixing ratio)} < 5.$$

Therefore, it has been found that the mixed quantities W1 and W2 of two kinds of particles only need to be determined based on a mixing ratio that satisfies the above relation by measuring zeta potential or mobility, particle size, and density regarding each of the first particles and the second particles or confirming the specifications of the same factors.

The entire disclosure of Japanese Patent Application No. 2005-049308, filed Feb. 24, 2005 is expressly incorporated by reference herein.

What is claimed is:

1. A dispersion comprising:
   a medium;
   a plurality of first charged particles that have a first polarity, the plurality of first charged particles being dispersed in the medium, mass of the plurality of first charged particles being represented as W1, each of the plurality of first charged particles including a titania; and
   a plurality of second charged particles that have a second polarity, the plurality of second charged particles being dispersed in the medium, mass of the plurality of second charged particles being represented as W2,
   the W1 and the W2 satisfying a following formula:

$$0.2 < W1/W2 < 5.$$

2. A microcapsule having the dispersion according to claim 1.

3. An electrophoretic device having the microcapsule according to claim 2.

4. An electro-optical device having the electrophoretic device according to claim 3.

5. A dispersion comprising:
   a medium;
   a plurality of first charged particles that have a first polarity, the plurality of first charged particles being dispersed in the medium, mass of the plurality of first charged particles being represented as W1; and
   a plurality of second charged particles that have a second polarity, the plurality of second charged particles being dispersed in the medium, mass of the plurality of second charged particles being represented as W2, each of the plurality of second charged particles including an acrylic,
   the W1 and the W2 satisfying a following formula:

$$0.2 < W1/W2 < 5.$$

6. A microcapsule having the dispersion according to claim 5.

7. An electrophoretic device having the microcapsule according to claim 6.

8. An electro-optical device having the electrophoretic device according to claim 7.

9. A dispersion comprising:
   a medium;
   a plurality of first charged particles that have a first polarity, the plurality of first charged particles being dispersed in the medium, mass of the plurality of first charged particles being represented as W1; and
   a plurality of second charged particles that have a second polarity, the plurality of second charged particles being dispersed in the medium, mass of the plurality of second charged particles being represented as W2, an absolute value of amount of charges of the plurality of the first charged particles being approximately equal to an absolute value of amount of charges of the plurality of the second charged particles,
   the W1 and the W2 satisfying a following formula:

$$0.2 < W1/W2 < 5.$$

10. A microcapsule having the dispersion according to claim 9.

11. An electrophoretic device having the microcapsule according to claim 10.

12. An electro-optical device having the electrophoretic device according to claim 11.

13. A microcapsule having a dispersion, the dispersion comprising:
    a medium;
    a plurality of first charged particles that have a first polarity, the plurality of first charged particles being dispersed in the medium, mass of the plurality of first charged particles being represented as W1; and
    a plurality of second charged particles that have a second polarity, the plurality of second charged particles being dispersed in the medium, mass of the plurality of second charged particles being represented as W2,
    the W1 and the W2 satisfying a following formula:

$$0.2 < W1/W2 < 5.$$

14. An electrophoretic device having the microcapsule according to claim 13.

15. An electro-optical device having the electrophoretic device according to claim 14.

* * * * *